US006975234B2

(12) United States Patent
Boccacci

(10) Patent No.: US 6,975,234 B2
(45) Date of Patent: Dec. 13, 2005

(54) SURVEILLANCE AND REMOTE ALARM SYSTEM FOR PERSONS SUBJECT TO LIMITATION OF FREEDOM OF MOVEMENT

(75) Inventor: Roberto Boccacci, Rome (IT)

(73) Assignee: Italdata Ingegneria Dell'Idea S.p.A., Rome (IT)

( * ) Notice: Subject to any disclaimer, the term of this patent is extended or adjusted under 35 U.S.C. 154(b) by 542 days.

(21) Appl. No.: 10/168,140

(22) PCT Filed: Dec. 13, 2000

(86) PCT No.: PCT/IT00/00514

§ 371 (c)(1),
(2), (4) Date: Jun. 17, 2002

(87) PCT Pub. No.: WO01/44836

PCT Pub. Date: Jun. 21, 2001

(65) Prior Publication Data

US 2002/0190864 A1     Dec. 19, 2002

(30) Foreign Application Priority Data

Dec. 17, 1999 (IT) .............................. RM99A0761

(51) Int. Cl.[7] .............................................. G08B 23/00
(52) U.S. Cl. ............................ 340/573.4; 340/539.13; 340/539.15; 340/539.16; 340/539.21
(58) Field of Search ............... 340/573.4, 573.1–573.7, 340/539.1–539.23

(56) References Cited

U.S. PATENT DOCUMENTS

| | | | |
|---|---|---|---|
| 4,837,568 A | * 6/1989 | Snaper | ..................... 340/10.52 |
| 4,885,571 A | 12/1989 | Pauley et al. | ............ 340/573.4 |
| 4,924,211 A | * 5/1990 | Davies | ..................... 340/573.4 |
| 4,999,613 A | * 3/1991 | Williamson et al. | ..... 340/573.4 |
| 5,255,306 A | * 10/1993 | Melton et al. | ................ 379/38 |
| 5,374,921 A | 12/1994 | Martin et al. | .......... 340/539.11 |
| 5,396,227 A | 3/1995 | Carroll et al. | ......... 340/825.36 |
| 5,448,221 A | * 9/1995 | Weller | ................... 340/539.21 |
| 5,471,197 A | * 11/1995 | McCurdy et al. | ........ 340/573.4 |
| 5,912,623 A | 6/1999 | Pierson | .................... 340/573.4 |
| 6,844,816 B1 | * 1/2005 | Melton et al. | ........... 340/572.1 |

FOREIGN PATENT DOCUMENTS

| | | |
|---|---|---|
| EP | 0 682 331 A | 11/1995 |
| HU | 213128 B | 10/1996 |
| HU | 218130 B | 7/1999 |
| WO | 99/08183 A | 2/1999 |

\* cited by examiner

Primary Examiner—Thomas J. Mullen, Jr.
Assistant Examiner—Son Tang
(74) Attorney, Agent, or Firm—Nixon & Vanderhye P.C.

(57) ABSTRACT

A surveillance and remote alarm system for persons subject to limitation of freedom of movement includes a fixed unit placed in the area within which the person can move and a personal bracelet element attached to the person subject to limitation of freedom of movement. The fixed unit is arranged to establish an electromagnetic connection with the personal element and a connection via a telephone line to an operations center. The fixed unit is equipped with a CPU associated with a fingerprint reader and a radio receiver arranged to interact with a similar radio transmitter fitted in the personal element together with a CPU that controls its operation. A sensor is provided to detect any interruption and/or anomalies in the connection between the fixed unit and the personal element and to send an alarm to the operations center.

5 Claims, 3 Drawing Sheets

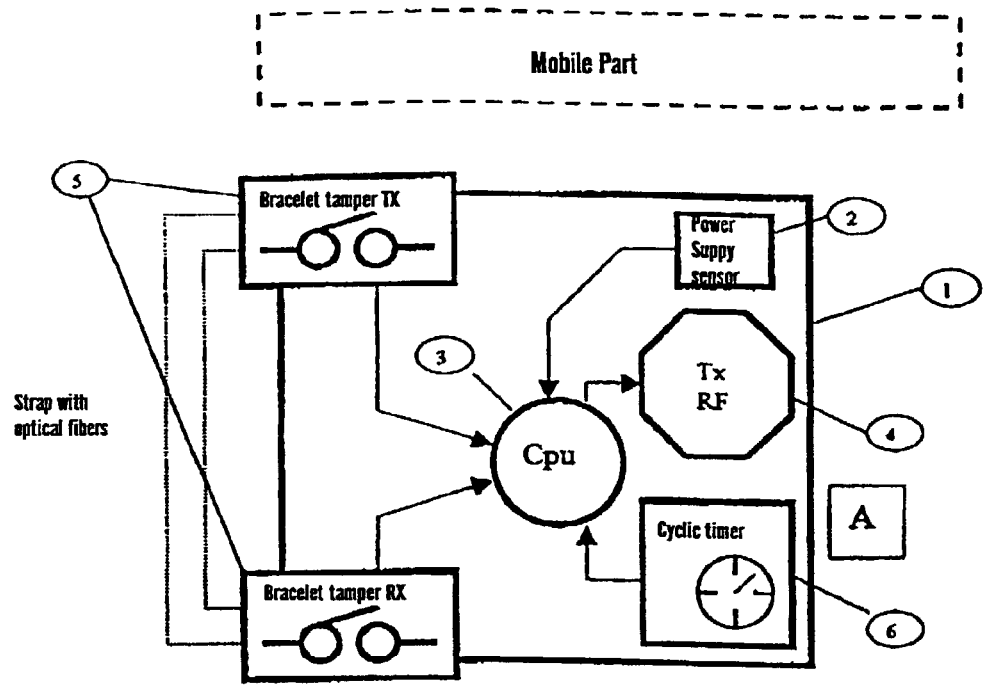
Fig. 1
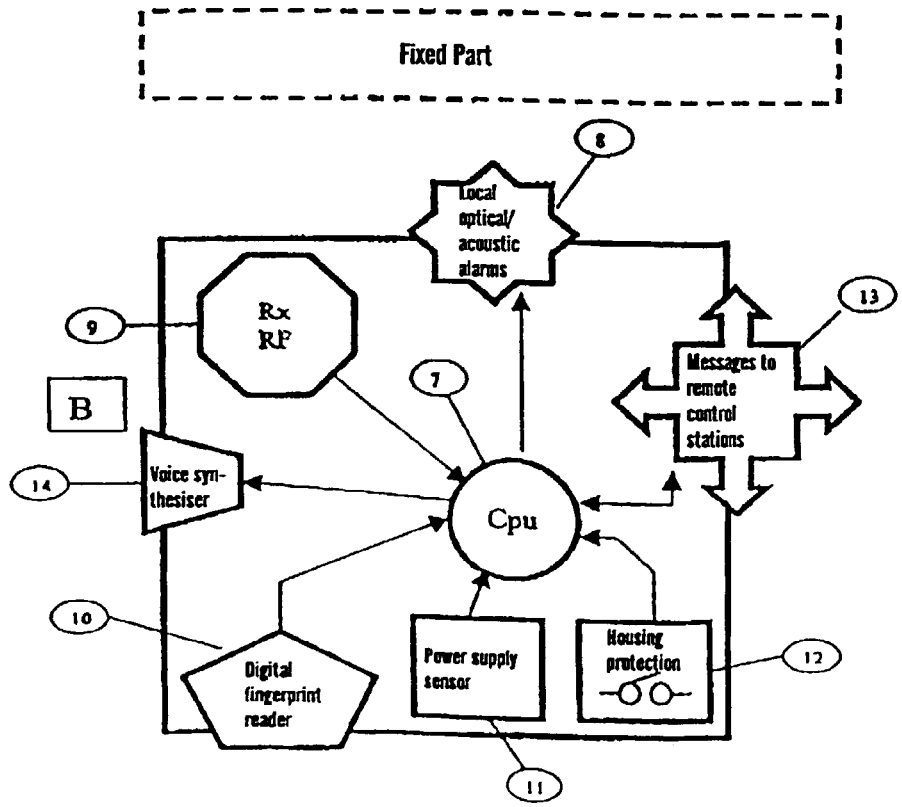

SURVEILLANCE AND REMOTE ALARM SYSTEM FOR PERSONS SUBJECT TO LIMITATION OF FREEDOM OF MOVEMENT

This application is the US national phase of international application PCT/IT00/00514 filed 13 Dec. 2000, which designated the US.

The present invention concerns a surveillance and remote alarm system for persons subject to limitation of freedom of movement.

BACKGROUND OF THE INVENTION

The outcry caused by events in the news in which persons have been held under house arrest, special surveillance and held on leave or in semi-liberty has had the effect of concentrating the attention of public opinion on electromagnetic devices for personal location, giving rise to a debate in which the arguments of the sceptics are losing ground and the adoption of such a system seems to be settled.

From reading the considerable amount of material published in the media, it is clear that many products, obviously foreign made, are already available, based on many different technologies and with many differing requirements.

The choices of technology made by the present manufacturers are highly diverse and some can certainly be criticised either from a technical point of view or for their functional logic.

It is possible to divide these devices, now known as "bracelets", into two groups.

Geographical location systems, designed to determine the position of the detainee wherever he may be.

Area location systems, able to reveal the presence of the detainee within a predetermined area.

Geographical location systems are based on various principles, among which the most modern and effective consists of a combination of GPS (satellite positioning system) and GSM (digital cellular telephony), which permits precise determination of the geographical coordinates of the detainee which are then transmitted to an operations centre where the coordinates can be transferred onto an electronic map for immediate display.

Such systems, that on first analysis might appear to be the definitive solution to the problem, are in reality extremely vulnerable because of satellite coverage, which can be easily screened outdoors and is non-existent inside buildings; also the GSM link is unreliable, as is well known to its users, therefore to entrust such a delicate subject to this technology is, on further analysis, imprudent.

Moreover, however strong it is possible to make the bracelets, it will always be possible to succeed in getting rid of them, making knowledge of their position useless.

From a strictly functional point of view, it is not necessary geographically to locate a person who automatically becomes a fugitive if he is not in the area stipulated for his house arrest. Furthermore, detainees who have the ability to sustain a lengthy absence are not normally sentenced to house arrest but rather persons whom it is useful to prevent from making occasional escapes, during which he might commit crimes.

Area location systems may be based on various principles, all using a bracelet worn by the detainee that is able to be detected by a fixed base that in turn has links with an operations centre from which countermeasures are coordinated based on the signals received from the fixed equipment.

The technologies upon which area systems are based are generally simple, reliable and well established from their widespread use in security systems and remote alarms, as used in museums, banks, dwellings, etc.

Both the installation and operating cost of these systems are much less and certainly more compatible with the high production quantities assumed.

These systems lend themselves to the adoption of various operating scenarios, choosing between whether the local control unit should be active or passive and whether it is periodically called by the operations centre or calls only in case of necessity, significantly cutting the costs of connection.

SUMMARY OF THE INVENTION

An analysis carried out by the applicant has led to the conclusion that the adoption of an area system is advantageous, both because of their technical features and costs, and has identified in detail all its active and security requirements, with a configuration that is able to meet current regulations.

Location by means of GPS could provided as an option and could make use of GSM technology for the transmission of data concerning the position.

The present invention has the following requirements and the location system has been designed with the following features:

The ability to reveal the presence of the detainee in the house;

The ability to provide in real time an alarm in the event of escape;

The ability to provide in real time an alarm in the event of forcing of the device;

Low power consumption of the section worn by the detainee;

Low installation and operating costs;

Adherence to the standing technical regulations in force.

It should be noted that in what follows we shall speak of a "location system" using the meaning previously explained. In addition, in the unit that is the subject of the invention the mobile part that is physically attached to the person to be monitored will be termed a "bracelet", given that this term has assumed a specific meaning for devices of this type with a portable unit to indicate presence in an area, but it should be understood that it includes actual bracelets, anklets, belts and the like, attached in a mechanically permanent manner to the body of a person during their period of service which is of a limited duration.

BRIEF DESCRIPTION OF THE DRAWINGS

The system that is the subject of the present invention will now be described with reference to a preferred embodiment described by way of a non-limiting illustration, it being understood that numerous variants and modifications could be introduced by those skilled in the art, and based on the figures in the attached drawings in which:

FIG. 1, parts "A" and "B", show respectively the general block diagram of the "bracelet" or mobile transmitting device and of the fixed transmitting device;

DETAILED DISCUSSION OF THE PREFERRED EMBODIMENTS

Figure 2:
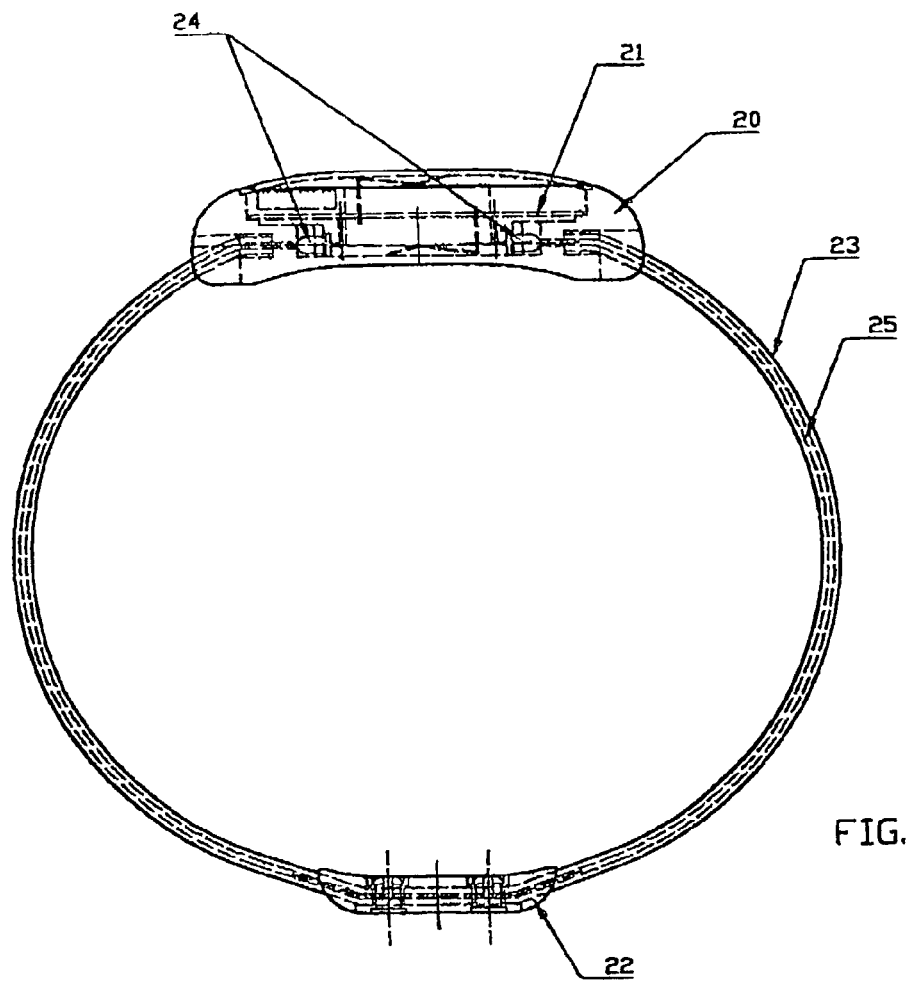
FIGS. 2 and 3 show respectively two sectional views at 90° to each other of the "bracelet" or mobile transmitting device.

Referring to the figures in the attached drawings, and in particular FIG. 1, part "A" comprising the mobile transmitting device includes a housing 1 inside which is a battery power supply 2, associated with a battery charge state sensor, to supply the electronics and to send an alarm signal to a suitably programmed microprocessor 3. The microprocessor 3 communicates with a radio frequency transmitter 4.

The microprocessor also communicates with a sensor 5 for sensing any tampering with the fixing strap of the mobile transmitting device and with a cyclic timer 6.

Part "B" of FIG. 1 shows the fixed receiving device, which includes a microprocessor 7 configured to control local optical/acoustic alarm units 8, a radio frequency receiver 9, a digital fingerprint reader 10, a power supply sensor 11 working with a main supply and associated back-up battery not shown in detail, a protective system for the container 12, a status indicator 13 connected via the telephone line or equivalent to a central surveillance station, and a synthesizer 14 for the reproduction of voice messages.

Figure 3:
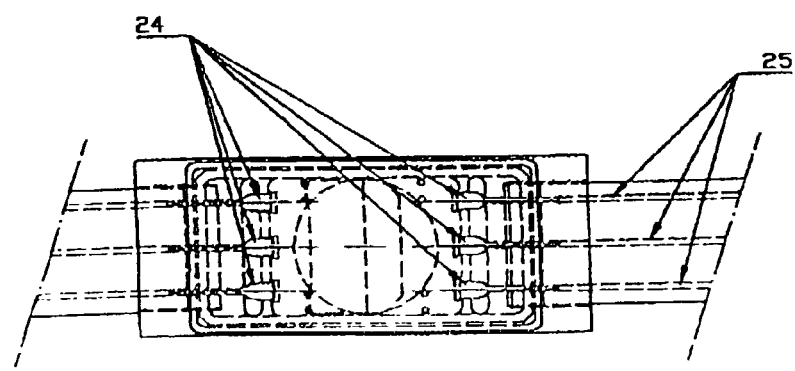

Referring to FIGS. 2 and 3, the mobile transmitting device includes an enclosing housing 20 containing an electronic circuit 21, a strap 23 locking and optical continuity device 22, a multiplicity of optical transmitting/receiving components 24 and fibre optic channels 25 inside the strap 23.

Figure 5:
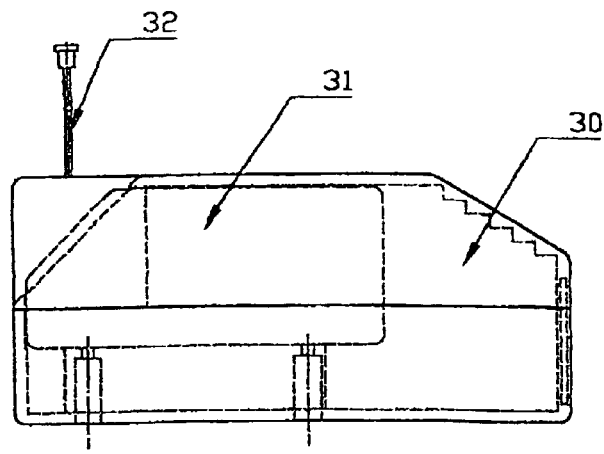
FIGS. 4, 5 and 6 show various side and plan views of the fixed receiving device.
Figure 4:
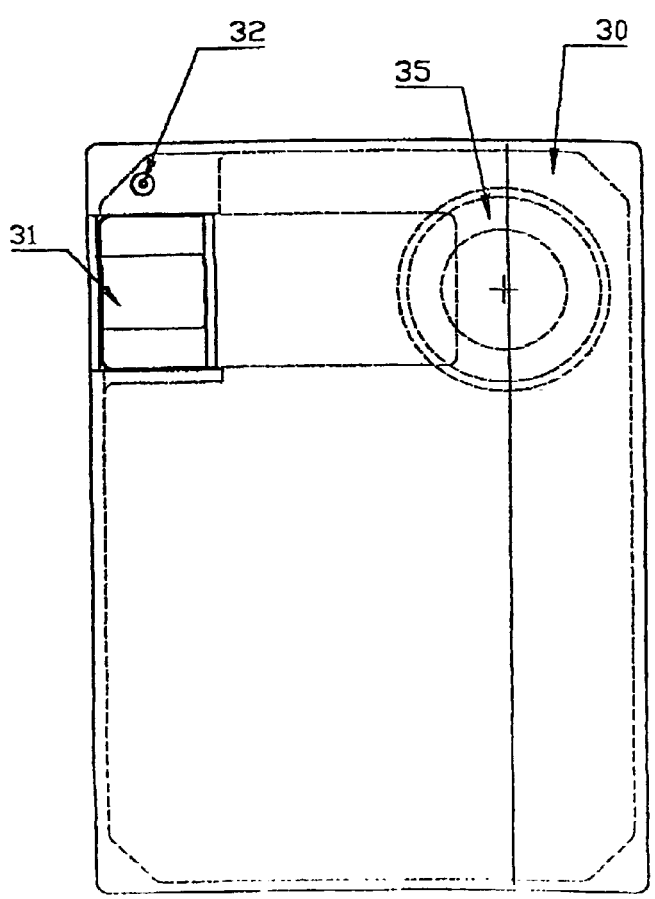
Figure 6:
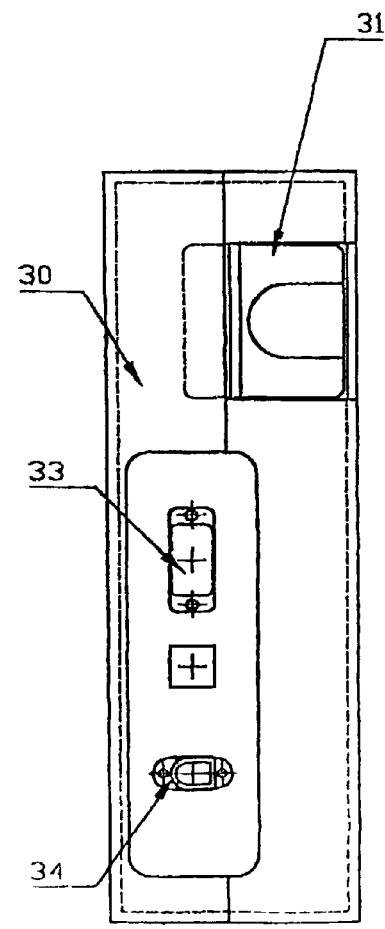

Referring to FIGS. 4, 5 and 6, the fixed receiving station includes an enclosing housing 30, with a window 31 on which a finger is placed for identification, an antenna 32, an ISDN serial communication connector 33, a socket for a switched telephone line (optional), a connection 34 for the electrical power input and a loudspeaker 35 for the reproduction of synthesised voice messages.

The operations of the system of the invention will now be described.

The mobile transmitting device shown in FIG. 1 "A" is designed periodically to transmit a coded message, different on each occasion, to the fixed receiving device shown in FIG. 1 "B".

In addition to data concerning maintenance of the link, the message must contain the binary states (in the form of bits) corresponding to the condition of the power supply and the condition of at least one additional input.

The message, understood as a series of bits, must be transmitted by means of the radio frequency transceiver (radio frequency 433.92 MHz).

The time interval between one message and the next must be able to vary from 3 to 60 seconds. In any event, for each change in the condition of the power supply and/or the input for monitoring the bracelet for tampering, the mobile transmitting device must immediately generate a new message.

It should be noted that the input for monitoring the bracelet for tampering must be understood as the logical result of comparison between the random logical state (0/1) imposed on (at least) 3 optical OUTPUT diodes and that measured on the same number of INPUT phototransistors. Optical channels may be tested at random intervals to check for consistency between signals sent (position and value) and those received.

The time interval between one comparison and the next may be random and/or predefined while the program is being written.

The fixed receiving device shown in FIG. 1 "B" is intended principally for the analysis of a periodic message transmitted by the mobile transmitting device.

By analysing the message, the fixed transmitting device must be able to establish the status of the link and identify any interruption to it.

In the positive case (interruption of the link) the fixed receiving device must establish the level of risk by considering both the number of messages lost in the last interruption (e.g. from a minimum of 1 to a maximum of n messages) and any previous interruptions that have occurred within a predefined period of time (e.g. from a minimum of 1 up to a maximum of 24 hours).

As regards the monitoring of the link alone, at the moment 2 levels of risk are being considered:

pre-alarm level and alarm level.

The pre-alarm level is reached when at least one of the following conditions is met:

too many interruptions of the link occur, even if they are of short duration, in the predefined time interval;
1) a prolonged interruption of the link occurs that exceeds the permitted limits;
2) the RF link is up but the data transmitted from the mobile transmitting device is incoherent for the coding level and/or in the content of the data.

When the pre-alarm level is reached, the fixed receiving device will initiate the checking procedures for the pre-alarm.

This procedure consists of all the following actions performed by the fixed receiving device:
1) attracting the attention of the holder of the mobile transmitting device, either acoustically by means of synthesised voice messages or optically, so that he approaches;
2) acquiring and checking the digital fingerprint of the detainee and;
3) processing the result of the check, preparing to cancel the pre-alarm if the result is positive or initiating the alarm procedure in the event of a prolonged non-recognition;
4) recording in the internal "file_log" all the significant data accompanied by the chronological reference;
5) optionally, notifying the occurrence of the pre-alarm to the remote concentrator device.

In the event of cancellation of the pre-alarm, the fixed receiving device resets the operating conditions prior to the pre-alarm but stores in memory the significant data relating to the event. This data will be considered by the fixed receiving device at the next occurrence of similar situations.

The alarm procedure essentially notifies the remote concentrator device of an event detected by the fixed receiving device.

The subject of remote notification is the data concerning the unique identification details of the fixed receiving device plus the total or partial contents of the internal "file_log".

The anti-forcing checks and diagnostics must include both the checks performed on both the mobile transmitting device and those on the fixed receiving device. In every case, the fixed receiving device is used for the notification of these events to the remote concentrator device.

Events relating to these checks will be notified to the remote concentrator device suitably encoded in order to distinguish them from pre-alarms and alarms.

The checks that are made on the mobile transmitting device preferably include a check for cutting of the strap and a check on the level of charge of the power supply battery.

The checks that are performed on the fixed receiving device preferably include a check for displacement and/or removal from the supporting wall of the fixed receiving device; a check for forcing of the housing of the fixed receiving device; a check for any conventional attempt to open the housing by means of the closure devices such as screws, bolts, etc.; checking the level of charge of the back-up battery; checking for the presence of the 220 VAC main supply.

The present invention has been described with reference to its currently preferred embodiments, but it will be understood that in practice many changes and modifications could be introduced without however departing from the sphere of protection of the present industrial patent.

What is claimed is:

1. A surveillance and remote alarm system for persons subject to limitation of freedom of movement, comprising:
   a fixed unit placed in an area within which the person can move; and
   a personal bracelet element attached to the person subject to limitation of freedom of movement,
   the fixed unit being arranged to establish an electromagnetic connection with the personal element and to connect via a telephone line to an operations center, the electromagnetic connection being encrypted and/or encoded and established at predetermined intervals;
   the fixed unit being equipped with a first CPU and a radio receiver arranged to interact with a corresponding radio transmitter contained in the personal element and a second CPU thereof; means communicating with the first and second CPUs to detect any interruption and/or anomalies in the connection between the fixed unit and the personal element and to send alarms to the operations center; means of detecting tampering or sabotage and consequently sending an alarm to the operations center; means for establishing the quality of the electromagnetic connection and sending an alarm in the event of a significant degradation in quality;
   the personal element including an anti-tamper system including optical fibres embedded in the element strap and optical channels are used which are tested at random intervals to check for consistency between signals sent and those received, wherein said fixed unit is further equipped with means for generating a local pre-alarm according to pre-set conditions without contacting the operations center and a digital fingerprint reader recognizing a fingerprint of said person subject to limitation of freedom of movement as a reset system for the pre-alarm wherein if the pre-alarm is not reset via the digital fingerprint reader, the system sends an alarm to the operations center.

2. System according to claim 1, wherein a casing for the fixed transceiver includes anti-tamper devices.

3. System according to claim 1, wherein a frequency of the radio connection is centred on 433.92 MHz.

4. System according to claim 1, wherein the fixed unit comprises means for recording an occurrence of the pre-alarm.

5. A surveillance and remote alarm system for persons subject to limitation of freedom of movement, comprising:
   a fixed unit placed in an area within which the person can move, the fixed unit including a first CPU, a radio receiver, and a telephone interface to communicate with an operations center via a telephone line; and
   a personal bracelet element attached to the person subject to limitation of freedom and having an encrypted or encoded electromagnetic connection with the fixed unit established at predetermined intervals, the personal bracelet element including a second CPU and a radio transmitter that communicates with the radio receiver,
   wherein the fixed unit further comprises a connection sensor communicating with the first and second CPUs that detects a status of the electromagnetic connection, and a tamper sensor communicating with the first and second CPUs that detects a tamper condition of the personal bracelet element, the personal bracelet element further comprising an anti-tamper system including optical fibers embedded in the element strap, the anti-tamper system communicating with the second CPU,
   wherein the first CPU is programmed to generate a local pre-alarm according to pre-set conditions without contacting the operations center, and wherein the fixed unit further comprises a digital fingerprint reader communicating with the first CPU, the digital fingerprint reader recognizing a fingerprint of the person subject to limitation of freedom of movement as a reset system for the pre-alarm wherein if the pre-alarm is not reset via the digital fingerprint reader, the system sends an alarm to the operations center.

* * * * *